Patented Feb. 1, 1944

2,340,701

UNITED STATES PATENT OFFICE 2,340,701

ESTERS OF ALCOHOLS OF THE ACETYLENE SERIES

Otto Schlichting and Karl Klager, Ludwigshafen-on-the-Rhine, Germany; vested in the Alien Property Custodian No Drawing. Application April 5, 1941, Serial No. 387,070
In Germany April 27, 1940

8 Claims. (Cl. 260—456)

The present invention relates to esters of alcohols of the acetylene series, more particularly to carboxylic and sulfonic acid esters of propinol-3 ($CH\equiv C-CH_2OH$) and butinol-3

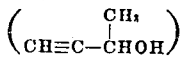

It is known that compounds of the acetylene series are distinguished from other aliphatic compounds in that the hydrogen atoms attached to the $-C\equiv C-$ group are particularly reactive. These hydrogen atoms may be replaced by metal or organic radicles. Phenylacetylene, for example, may be converted into ketones by causing the sodium compound of phenyl acetylene to react with carboxylic acid chlorides. Even alcohols of the acetylene series differ from other aliphatic alcohols. When oxidizing, for example, propinol-3 in the form of its copper compound, there is obtained hexadiine-diol whereas the hydroxy group remains unchanged. Due to the difference of alcohols of the acetylene series from other aliphatic alcohols, carboxylic and sulfonic acid esters of such alcohols have hitherto not been prepared.

We have now found that carboxylic and sulfonic acid esters of propinol-3 and butinol-3 may be prepared in a simple manner by causing carboxylic acid anhydrides or halides or sulfonic acid halides to act on propinol-3 or butinol-3 in the liquid phase in the presence of water. Said esters have the following constitution:

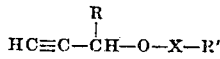

wherein
R is hydrogen or methyl,
X is $-CO-$ or $-SO_2-$ and
R' is alkyl or aryl.

Suitable anhydrides and halides are for example those of mono- and polybasic aliphatic carboxylic acids, e. g. of acetic acid, propionic acid, succinic acid, maleic acid or adipic acid, of araliphatic or aromatic mono or polycarboxylic acids, e. g. benzoic acid, nitrobenzoic acid, chlorobenzoic acid or phthalic acid, or of heterocyclic carboxylic acids, e. g. pyridine carboxylic acid. Suitable sulfonic acid halides are for example propane sulfonic acid chlorides and the sulfonic acid chlorides obtainable by the reaction between saturated aliphatic or cycloaliphatic hydrocarbons and sulfur dioxide and chlorine as well as benzene or para-toluene sulfonic acid chloride.

In order to effect the esterification, the propinol-3 or butinol-3 which may be dissolved in water, is admixed at normal temperature or while cooling with the acid anhydride or halide. An agent capable of binding acids, for example the calculated amount or an excess of an alkali metal hydroxide, carbonate, an alkali earth metal hydroxide or carbonate or tertiary amino compound, is then added, while simultaneously stirring the reaction mixture. The esters formed are insoluble in water and may be easily separated from the aqueous reaction mixture. They may be purified by distillation.

As already mentioned, the reaction may be carried out at normal temperature or at lower temperature. It is, however, possible to work at elevated temperature, for example while boiling the reaction mixture under reflux cooling.

The esters of propinol-3 and butinol-3 obtained according to the present invention are suitable for introducing directly acetylene radicles into organic compounds.

The following examples will further illustrate how the present invention may be carried out in practice. However, the invention is not restricted to these examples.

*Example 1*

1500 grams of benzene sulfonic acid chloride are admixed at 0° C. with 4200 grams of a 25 per cent aqueous solution of propinol-3. 100 cubic centimeters of a 35 per cent sodium hydroxide solution are allowed to flow slowly into this mixture, while stirring and cooling to 0° C. After having been stirred for several hours, the solution has become neutral. The benzene sulfonic acid ester of propinol-3 separates in the form of an oil. The yield amounts to from 90 to 95 per cent. The ester may be purified by distillation under reduced pressure. It boils at 142–144° C. under 4 millimeters pressure.

From 76.2 grams of para-toluene sulfonic acid chloride, 250 grams of a 25 per cent aqueous solution of propinol-3 and 50 cubic centimeters of a 35 per cent aqueous solution of sodium hydroxide there is obtained under otherwise identical conditions the para-toluene sulfonic acid ester of propinol-3. It boils at 161–162° C. under 4 millimeters pressure.

*Example 2*

600 grams of a 25 per cent aqueous solution of propinol-3 are cooled to 20° C. below zero and admixed with 140 grams of benzoic acid chloride, 114 cubic centimeters of an aqueous 35 per cent solution of sodium hydroxide are allowed to flow slowly into this emulsion while stirring at 20° C. below zero. The reaction mixture is then allowed to warm up slowly to room temperature. It then has a neutral reaction. The benzoic acid ester of propinol-3 formed is extracted with ether, the ethereal solution washed with water, the ether removed and the ester distilled under reduced pressure. It boils at 103–109° C. under 8 millimeters pressure. The yield amounts to 85 per cent.

When starting from 600 cubic centimeters of a 25 per cent aqueous solution of propionol-3, 102 grams of acetic acid anhydride and 114 cubic centimeters of an aqueous 35 per cent solution of sodium hydroxide, there is obtained the acetic acid ester of propinol-3, boiling at 111–112° C.

Example 3

23 grams of a 35 per cent aqueous solution of sodium hydroxide are allowed to flow slowly into a mixture of 23.2 grams of a 60 per cent solution of butinol-3 and 35.3 grams of benzene sulfonic acid chloride, while stirring at 0° C. After having stirred for several hours, the mixture has become neutral. Two layers are formed. The oily layer is separated from the aqueous layer. The benzene-sulfonic acid ester of butinol-3 is thus obtained in a yield of 80 per cent.

Example 4

170 grams of an aqueous 35 per cent solution of sodium hydroxide are allowed to flow slowly into a mixture of 116.6 grams of a 60 per cent aqueous solution of butinol-3 and 285.2 grams of para-toluene sulfonic acid, chloride, while stirring at 30–40° C. Stirring is continued until the reaction mixture has become neutral. The solution is then cooled with ice and diluted with 300 cubic centimeters of water. The para-toluene sulfonic acid ester of butinol-3 separates in the form of crystals which are filtered off and washed with water. The yield is 87 per cent. After recrystallization from cyclohexane, the ester melts at 58–60° C.

Example 5

86 grams of an aqueous 35 per cent solution of sodium hydroxide are allowed to flow drop by drop into a suspension of 58.3 grams of butinol-3 (in 60 per cent aqueous solution) and 76.5 grams of acetic acid anhydride which suspension has been cooled to 20° C. below zero. The mixture is then allowed to warm up slowly to room temperature, while stirring until it has become neutral. After having added 100 cubic centimeters of water, the ester formed is separated off as an oil, dried with anhydrous sodium sulfate and distilled. It boils at 124–126° C. The yield is 45.6 grams corresponding to 81.5 per cent.

Example 6

172 grams of an aqueous 35 per cent solution of sodium hydroxide is allowed to flow drop by drop into a mixture of 116.7 grams of butinol-3 (in 60 per cent aqueous solution) and 210 grams of benzoic acid chloride which mixture has been cooled to 10° C. below zero. The whole is then stirred at room temperature until the reaction has become neutral. After having added 200 cubic centimeters of water, the whole is cooled down to 0° C., the ester formed is filtered off and washed with water. After recrystallization from ligroin this benzoic acid ester of butinol-3 melts at 27–30° C. The yield is 155 grams corresponding to 88.7 per cent.

Example 7

114 cubic centimeters of an aqueous 35 per cent sodium hydroxide solution are allowed to flow drop by drop into a mixture of 600 cubic centimeters of an aqueous 23.6 per cent solution of propinol-3 with 185.5 grams of para-nitrobenzoic acid chloride while stirring at 10–20° C. below zero. Cooling is then discontinued and the mixture stirred at room temperature until it has become neutral. The precipitate formed is filtered off, washed with dilute sodium carbonate solution and dried. 150 grams of para-nitrobenzoic acid ester of propinol-3 are thus obtained. After recrystallization from ligroin it melts at 89–90° C.

What we claim is:

1. Esters of alcohols of the acetylene series corresponding to the general formula:

$$HC\equiv C-\underset{\underset{R}{|}}{C}H-O-SO_2-R'$$

wherein R stands for a member of the group consisting of methyl and hydrogen and wherein R' stands for a member of the group consisting of alkyl and aryl radicals.

2. Esters of alcohols of the acetylene series corresponding to the general formula $$HC\equiv C-\underset{\underset{R}{|}}{C}H-O-SO_2-R_2$$

wherein R stands for a member of the group consisting of methyl and hydrogen and wherein $R_2$ stands for an aromatic radicle.

3. A process for the production of esters of alcohols of the acetylene series which consists in causing a halide of a sulfonic acid to act in the liquid phase on an alcohol selected from the group consisting of propinol-3 and butinol-3 in the presence of water and an agent capable of binding acid.

4. Esters of alcohols of the acetylene series corresponding to the general formula $$HC\equiv C-\underset{\underset{R}{|}}{C}H-O-SO_2-R_2$$

wherein R stands for a member of the group consisting of methyl and hydrogen and wherein $R_2$ stands for a mononuclear hydrocarbon radicle of the benzene series.

5. The process as defined in claim 3 wherein the halide of a sulfonic acid is the halide of an aromatic sulfonic acid.

6. The ester of the following constitution:

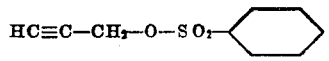

7. The ester of the following constitution:

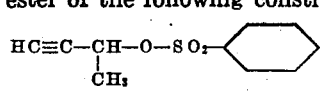

8. The ester of the following constitution:

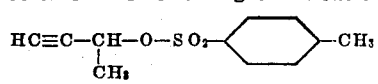

OTTO SCHLICHTING.
KARL KLAGER.